United States Patent [19]
Sano et al.

[11] Patent Number: 5,209,110
[45] Date of Patent: May 11, 1993

[54] OVER-LOADING MONITORING SYSTEM FOR ELECTRIC MOTOR IN AUTOMOTIVE ENGINE SIMULATING APPARATUS

[75] Inventors: Kaoru Sano; Fumio Mizushina; Takashi Goto; Toshimitsu Maruki, all of Shizuoka; Yukio Naganuma, Tokyo, all of Japan

[73] Assignee: Kabushiki Kaisha Meidensha, Japan

[21] Appl. No.: 624,962

[22] Filed: Dec. 10, 1990

[30] Foreign Application Priority Data

Dec. 11, 1989 [JP] Japan .................................. 1-320819

[51] Int. Cl.$^5$ .......................................... G01M 19/00
[52] U.S. Cl. ................................................ 73/118.1
[58] Field of Search .................... 73/116, 117.2, 117.3, 73/118.1

[56] References Cited

U.S. PATENT DOCUMENTS

| | | | |
|---|---|---|---|
| 3,890,832 | 6/1975 | Nick et al. | 73/116 |
| 3,898,875 | 8/1975 | Knoop et al. | 73/116 |
| 4,141,244 | 2/1979 | Dumbeck | 73/862 |
| 4,581,923 | 4/1986 | Nitao et al. | 73/116 |
| 4,870,585 | 9/1989 | Manzolini | 73/116 |
| 4,995,139 | 2/1991 | Suzuki | 73/116 |

*Primary Examiner*—Jerry W. Myracle
*Attorney, Agent, or Firm*—Ronald P. Kananen

[57] ABSTRACT

An over-loading detection system periodically samples a motor operating parameter, e.g. a revolution speed and an output torque at a predetermined relatively short sampling period. Based on the sampled motor operating parameter, a ratio of the output torque and a predetermined over-load rating torque is derived and stored. Over-load detection is performed with respect to a plurality of sampled ratios of the output torque and the over-load rating torque by deriving a running average and comparing the derived running average value with a predetermined threshold.

2 Claims, 2 Drawing Sheets

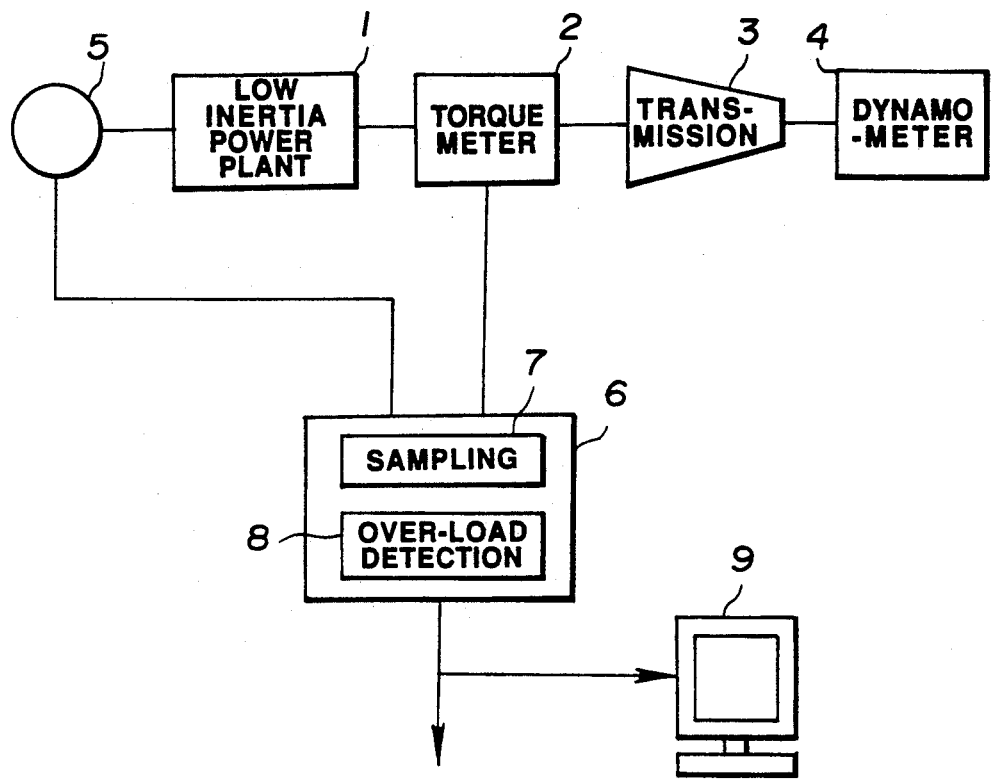
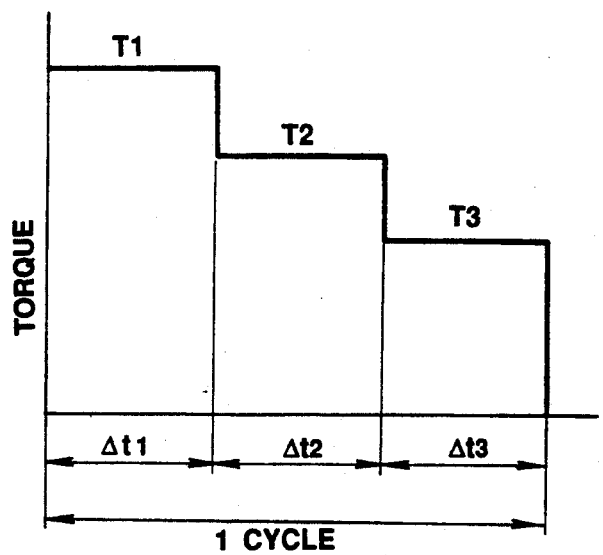

OVER-LOADING MONITORING SYSTEM FOR ELECTRIC MOTOR IN AUTOMOTIVE ENGINE SIMULATING APPARATUS

BACKGROUND OF THE INVENTION

1. Field of the Invention

The present invention relates generally to a control system for controlling operation of an electric motor, particularly for the motor applied for simulating an automotive internal combustion engine for testing an engine driven vehicular component, such as an automatic power transmission, an automatic transaxle, a differential gear unit and so forth. More specifically, the invention relates to a system for monitoring an electric motor being driven at an over-loaded state.

2. Description of the Background Art

An automatic power transmission testing apparatus employing an electric motor has recently been proposed with an engine output characteristics simulating system. Such system is called as a transient-dynamometer (TR-DY), in which a high or a great inertia in the electric motor has been compensated for simulating the automotive engine driving characteristics with satisfactorily high response. In such system, a direct-current motor is employed as a driving torque source. The direct-current motor employed in such system tends to be driven in an over-loaded condition in view of the capacity defined in continuous rating.

In general, the rating of the electric motor is defined by:

(1) it should not become over-loaded for nominal rating torque which is a temporary maximum output;

(2) a 25% ED rating should be standard, which 25% ED means in the cyclic drive in a given pattern that 25% is driven at the nominal rating torque and remaining 75% is driven at a no-load condition; and (3) a continuous drive is possible when RMS value (square-average) in each cycle is lower than or equal to 50% of the nominal rating torque.

As seen from FIG. 3, assuming that the torque at respective cycles of $\Delta t_1$ to $\Delta t_3$ are respectively $T_1$ to $T_3$, the RMS value and the condition (3) can be expressed by:

$$RMS = \sqrt{\frac{T_1^2 \cdot \Delta t_1 + T_2^2 \cdot \Delta t_2 + T_3^2 \cdot \Delta t_3}{\Delta t_1 + \Delta t_2 + \Delta t_3}} \leq 50\% \cdot T_0 \quad (1)$$

By dividing both sides by $T_0$ and setting $T_1/T_0 = T_a$ and $T_2/T_0 = T_b$ and $T_3/T_0 = T_c$, the foregoing equation (1) can be modified, if $T1 = t2 = T3 = T$, as $$\sqrt{\frac{T_a^2 \cdot \Delta t_1 + T_b^2 \cdot \Delta t_2 + T_c^2 \cdot \Delta t_3}{\Delta t_1 + \Delta t_2 + \Delta t_3}} \leq 50\% \quad (2)$$

On the other hand, driving at 25% ED is expressed as an RMS value by the following equation $$RMS = \sqrt{\frac{(T0/T0)^2 \cdot \Delta t}{4 \cdot \Delta t}} = 50\% \quad (3)$$

From the foregoing it should be appreciated the value representative of RMS value at 25% ED becomes 50% of the nominal rating torque.

For the motor which is expected to be driven in an over-loaded condition, a driving pattern is set so that the magnitude of over-loading cannot be greater than a predetermined limit. In the prior art, a thermal relay or a temperature switch is used for detecting over-heating due to excessive load for protecting the motor from an excessive over-loading condition.

However, none of the conventionally attempted ways for detecting over-loading condition are successful in view of accuracy and response time required for detection of excessive load.

SUMMARY OF THE INVENTION

Therefore, it is an object of the present invention to provide an over-loading monitoring system which can solve the drawbacks in the prior art.

In order to accomplish the aforementioned and other objects, an over-loading detection system, according to the present invention, periodically samples a motor operating parameter, e.g. a revolution speed and an output torque at a predetermined relatively short sampling period. Based on the sampled motor operating parameter, a ratio of the output torque and a predetermined over-load rating torque is derived and stored. Over-load detection is performed with respect to a plurality of sampled ratio of the output torque and the over-load rating torque by deriving a running average and comparing the derived running average value with a predetermined threshold.

In practice, calculation of the running average and over-load detection can be done by the following formula:

$$RMS = \sqrt{\sum_{k=1}^{n} Tsi^2/n} \leq 50\% \cdot T_0$$

wherein Tsi represents the sampled instantaneous output torque.

In the alternative, calculation of the running average and over-load detection can also be done by the following formula:

$$RMS = \sqrt{\sum_{k=1}^{n} Ti^2/n} \leq 50\%$$

wherein Ti represents a ratio of the sampled instantaneous output torque and a predetermined over-load rating torque.

According to one aspect of the invention, an excess over-load detecting system for an electric motor comprises:

a first sensor for monitoring revolution speed of the electric motor for producing a revolution indicative signal;

a second sensor for monitoring an output torque for producing an output torque indicative signal;

third means for periodically sampling the revolution speed indicative signal and the output torque indicative signal at a predetermined sampling period;

fourth means for processing the sampled signals over a predetermined over-loading detection period which is set at substantially longer than that of the sampling period so that a predetermined number of input signals can be sampled therein for deriving a motor load indicative data, the fourth means comparing the motor load indicative data with a predetermined load criterion to output an over-loading detection signal when the motor load indicative data is greater than the load criterion.

A bench testing apparatus for testing a vehicular component which is associated with an automotive internal combustion engine, the apparatus including a low inertial power plant having an electric motor as a prime mover for providing an automotive engine characteristics simulated output torque for driving the vehicular component, the testing apparatus including an excess over-load detecting system for an electric motor, comprising:

a first sensor for monitoring revolution speed of the electric motor for producing a revolution indicative signal;

a second sensor for monitoring an output torque for producing an output torque indicative signal;

third means for periodically sampling the revolution speed indicative signal and the output torque indicative signal at a predetermined sampling period;

fourth means for processing the sampled signals over a predetermined over-loading detection period which is set at substantially longer than that of the sampling period so that a predetermined number of input signals can be sampled therein for deriving a motor load indicative data, the fourth means comparing the motor load indicative data with a predetermined load criterion to output an over-loading detection signal when the motor load indicative data is greater than the load criterion.

The fourth means may further derive a ratio of an actual torque represented by the output torque indicative signal and predetermined torque criterion, and a running average of the ratio of the output torque indicative signal and the torque criterion, and derives the motor load indicative data so that excess over-loading condition can be detected based on the motor load indicative data and the predetermined load criterion. The fourth means may be the over-loading detection period as much longer in length than the sampling period, so that an integral number of input data can be sampled therein.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 1 is a schematic illustration of a bench testing apparatus for an automotive automatic power transmission, in which is employed an electric motor in a low inertia power plant and the preferred embodiment of an over-loading monitoring system, according to the invention;

FIG. 3 is a chart showing a variation of driving torque in one cycle.

DESCRIPTION OF THE PREFERRED EMBODIMENT

Figure 2:
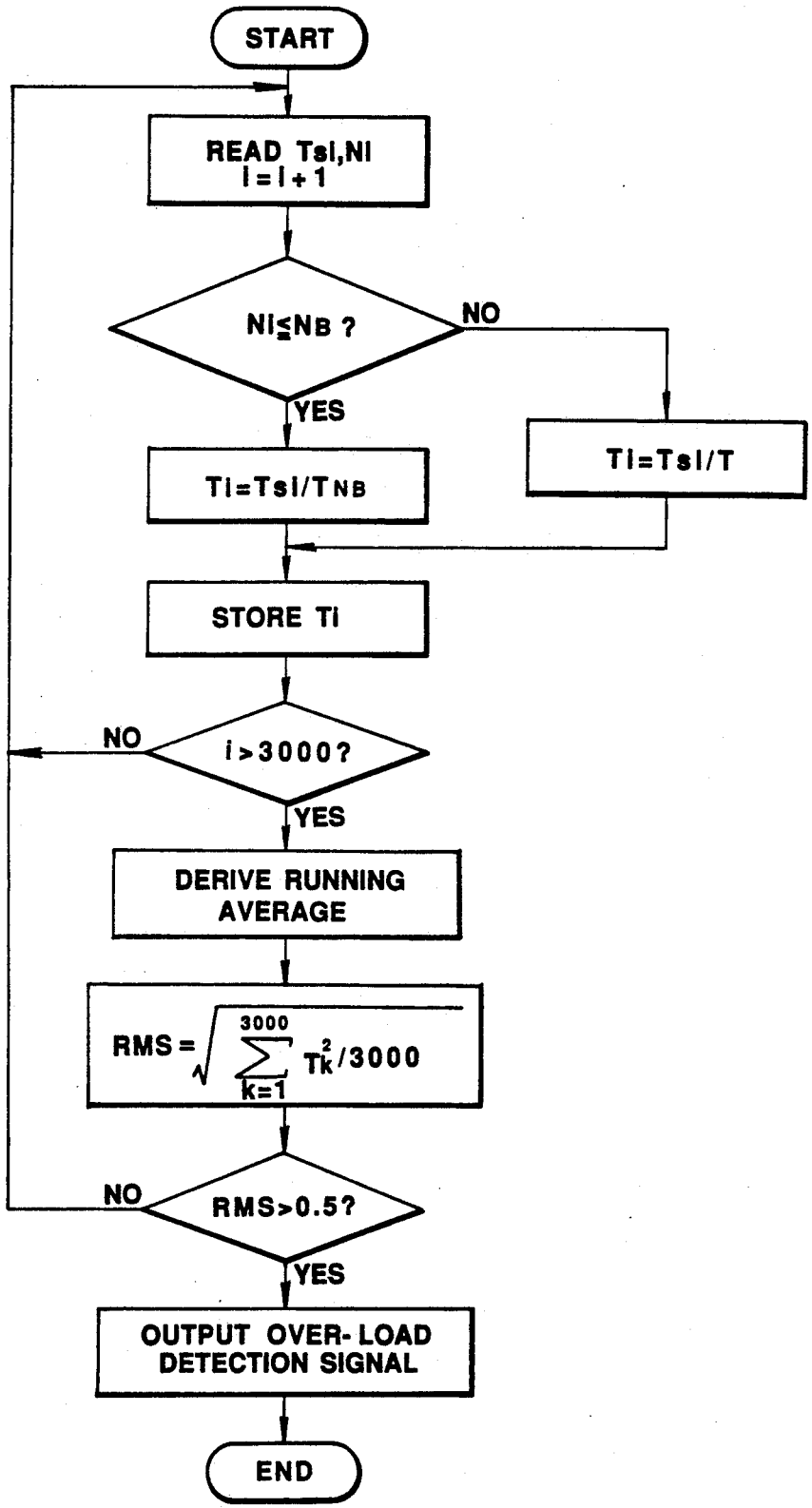
FIG. 2 is a flowchart showing a process implementing the preferred embodiment of over-load monitoring according to the invention.

Referring now to the drawings, particularly to FIG. 1, there is illustrated a bench testing apparatus for an automotive power transmission. The apparatus employs a low inertia power plant 1 which includes an electric motor. The electric motor in the low inertia power plant 1 is coupled with a speed increasing device or any appropriate device which can compensate a high inertia of the electric motor in order to simulate an automotive engine. The low inertia power plant 1 is connected to an automatic power transmission 3 to be tested, via a torque meter 2. A dummy load 4 such as a dynamometer for absorbing driving torque is connected to the output shaft of the automatic power transmission.

A computer based controller 6 is connected to a revolution speed sensor 5 which monitors revolution speed of the motor to produce an engine speed simulated revolution speed signal. The controller 6 is also connected to the torque member to receive therefrom an output torque indicative signal which represents the output torque of the low inertia power plant 1. The controller 6 includes a sampling stage 7 for sampling the input signals and an over-load detecting section 8. The over-load detecting section 8 processes the input data for deriving a square-average of the torque and comparing the derived average value with a predetermined over-load criterion to make a judgement of an over-loading condition. The controller 6 is connected to a display monitor 9 for displaying the result of monitoring.

A process to be implemented for detecting an over-loading condition of the electric motor will be discussed herebelow with reference to FIG. 2. At first, the low inertia power plant 1 is started to supply the output torque to the automatic power transmission. Then, the revolution speed sensor 5 and the torque meter 2 becomes active to produce the revolution speed indicative signal Ni and the output torque indicative signal Tsi. The revolution speed indicative signal Ni and the output torque indicative signal Tsi are sampled by the sampling stage 7. In the shown embodiment, the sampling stage samples the input signals in a given intervals, e.g. every 0.1 sec. Also, in the shown embodiment, a unit period for detecting an over-loading condition on the electric motor is set at 5 min. Therefore, in each sampling cycle, 3000 data samples may be obtained.

The over-loading detecting section compares each sampled revolution speed data $Ni(i=1\sim 3000)$ with a revolution speed criterion $N_B$ which is set at a weak field criterion. If the revolution speed data Ni is smaller than or equal to the revolution speed criterion $N_B$, a ratio Ti between the output torque Tsi and a predetermined over-load rating torque $T_{NB}$ is derived. On the other hand, when the revolution speed data Ni is greater than the revolution speed criterion $N_B$, the ratio Ti is derived between the output torque Tsi and a over-load rating torque T. The over-load rating torque T is derived based on the revolution speed and, in practice set in a memory. Therefore, the over-load rating torque may be derived by table or map look-up in terms of the revolution speed Ni. The ratio Ti thus derived is stored in a memory (not shown). The foregoing sampling process is performed at each sampling timing and thus repeated for 3000 times in each over-load detection cycle.

If necessary, an RMS derivation process can be performed with respect to each sampling data with the already sampled data, for protecting the motor from excess over-loading.

When 3000 or more data are sampled, the sampled data are processed for deriving a running average. At the sample time, data shifting in the memory is performed for erasing the old data which was sampled more than 3000 cycles ahead so that the memory can hold the most recently sampled of the 3000 sample data. Then, sampled data is processed for deriving the RMS value.

Here, assuming the sampled data is Tk, the RMS value can be derived through the following equation:

$$RMS = \sqrt{\sum_{k=1}^{3000} Tk2/3000}$$

The RMS value thus derived is compared with a predetermined criterion value, e.g. 0.5 (50%). If the RMS value is greater than the criterion value, an excess over-loading detecting signal is output. Otherwise, the process returns to repeat the foregoing process with respect to the next sample.

The excess over-loading detecting signal is fed to the display 9 for indicating an excessive over-loading condition of the motor.

With the shown embodiment, the objects and advantages sought therefore can be fulfilled.

While the present invention has been discussed in terms of the preferred embodiment of the invention, the invention should not be understood to be specified to the specific embodiment set forth above but includes all possible embodiments and modifications which can be implemented without departing from the principle of the invention.

What is claimed is:

1. In an apparatus for testing an automotive power transmission:
   a power plant including an electric motor;
   a torque meter connected to said power plant;
   an automotive power transmission connected to said torque meter and having output shaft;
   a dummy load connected to said output shaft of said automotive power transmission;
   a revolution speed sensor so constructed and arranged as to monitor revolution speed of said electric motor and produce a revolution speed signal indicative of said monitoring revolution speed;
   said torque meter being so constructed and arranged as to monitor an output torque indicative signal indicative of said monitored output torque;
   a controller connected to said torque meter and said revolution speed sensor, said controller including means for performing a first step of giving said torque indicative signal a weight which is a function of said revolution speed indicative signal and storing the result as data, a second step of repeating said first step a predetermined number of times to provide a predetermined number of said stored data, a third step of deriving a running average of said predetermined number of stored data; a fourth step of evaluating said running average in comparison with a predetermined criterion; and a fifth step of outputting an overloading signal in response to a result of evaluating step; and
   means responsive to said over-loading signal for indicating an over-loading condition of said electric motor.

2. In an apparatus for testing an automotive power transmission:
   a power plant including an electric motor;
   a torque meter connected to said power plant;
   an automotive power transmission connected to said torque meter and having an output shaft of said automotive power transmission;
   a revolution speed sensor so constructed and arranged as to monitor revolution speed of said electric motor and produce a revolution speed signal indicative of said monitored revolution speed;
   said torque meter being so constructed and arranged as to monitor an output torque indicative signal indicative of said monitored output torque;
   a controller connected to said torque meter and said revolution speed sensor, said controller including means for performing a first step of giving said torque indicative signal a weight which is a function of said revolution speed indicative signal and storing the result as data, a second step of repeating said first step a predetermined number of times to provide a predetermined number of said stored data, a third step of deriving a running average of said predetermined number of stored data; a fourth step of calculating a predetermined value out of said running average; a fifth step of comparing said predetermined value with a preset criterion; and a sixth step of outputting an over-loading signal when said predetermined value is greater than said preset criterion; and
   means responsive to said over-loading signal for indicating an over-loading condition of said electric motor.

* * * * *